United States Patent [19]

Ariel et al.

[11] Patent Number: 4,725,735
[45] Date of Patent: Feb. 16, 1988

[54] POWER SUPPLY FOR ELECTRICAL DETECTORS PARTICULARLY FOR GAMMA RADIATION MONITORS

[75] Inventors: Carmi Ariel, Ramat Hasharon; Yehuda Gabay, Omer, both of Israel

[73] Assignee: Amcor Electronics Ltd., Herzlia, Israel

[21] Appl. No.: 767,907

[22] Filed: Aug. 21, 1985

[30] Foreign Application Priority Data

Nov. 16, 1984 [IL] Israel .................................... 73528

[51] Int. Cl.⁴ .............................................. G01T 1/175
[52] U.S. Cl. .................................... 250/386; 250/374; 320/1; 363/21
[58] Field of Search ............... 250/389, 388, 387, 386, 250/378, 377, 376, 374; 363/20, 21; 320/1

[56] References Cited

U.S. PATENT DOCUMENTS 3,428,807  2/1969  Jones et al. ......................... 250/387
3,878,496  4/1975  Erickson ........................... 250/336.1
4,546,257 10/1985  Lewiner et al. .................... 250/388

FOREIGN PATENT DOCUMENTS 1229654 12/1966 Fed. Rep. of Germany .
3145015  5/1983 Fed. Rep. of Germany ...... 250/374
2534693  4/1984 France

OTHER PUBLICATIONS

Prof. Dr. Med. H. Grüter, "Taschenrechner als digital anzeigendes Strahlungsmessgerät", *Electronik*, vol. 25, No. 12 (Dec. 1976), pp. 65–66.

Primary Examiner—Janice A. Howell
Assistant Examiner—Constantine Hannaher
Attorney, Agent, or Firm—Benjamin J. Barish

[57] ABSTRACT

A power supply for a gamma radiation detector, or other detector device electrically detecting the aperiodic occurrence of a phenomenon, comprises a free-running oscillator periodically outputting, at a low repetition rate, pulses having short widths and long intervals between them; a capacitor chargeable to the detector operating voltage for operating the electrical detector device; a charging circuit coupling the oscillator to the capacitor for charging same by the pulses periodically outputted by the oscillator, the capacitor being partially discharged by the detector device upon a detection of the phenomenon; and an oscillator control effective, upon a detection of the phenomenon by the detector device, to trigger the oscillator to immediately output a pulse for recharging the capacitor.

18 Claims, 3 Drawing Figures

POWER SUPPLY FOR ELECTRICAL DETECTORS PARTICULARLY FOR GAMMA RADIATION MONITORS

BACKGROUND OF THE INVENTION

The present invention relates to a novel power supply for electrical detector devices, and also to an electrical detector system including the novel power supply. The invention is particularly useful in small, portable battery-operated gamma radiation detectors, and is therefore described below with respect to this application, although it will be appreciated that the invention could advantageously be used in many other applications as well.

A number of detectors are known for detecting gamma radiation (produced, for example, by atomic reactors, atomic explosions, or atomic waste) in order to alert the user to a condition of excessive radiation which may be harmful or even fatal. The conventional gamma radiation detector, such as the Geiger counter, outputs electrical pulses, converted to audible or visual signals, at a rate proportional to the intensity of the gamma radiation field. Such detectors require a high operating voltage, in the order of 500 volts DC, supplied either from the AC mains or from DC batteries. A main disadvantage of the presently used battery-powered gamma radiation detectors is the large amount of energy consumed in the operation of the device because of the high operating voltage, thereby requiring frequent replacement of the batteries.

BRIEF SUMMARY OF THE INVENTION

An object of the present invention is to provide a power supply for a detector device particularly a gamma radiation detector, having advantages in the above respects. Another object of the invention is to provide an electrical detector system including a detector device such as a gamma radiation detector, and a battery-operated power supply capable of operation for long periods of time before replacement of the batteries is required.

While the invention is particularly useful with respect to gamma radiation detectors, it will be appreciated, as will be more fully described below, that the invention could also advantageously be used with other detectors which electrically detect the aperiodic occurrence of a phenomenon.

According to a broad aspect of the invention, there is provided a power supply for a detector device electrically detecting the aperiodic occurrence of a phenomenon, comprising: a free-running oscillator periodically outputting at a low repetition rate, pulses having short widths and long intervals between them; capacitor means chargeable to the detector operating voltage for operating the electrical detector device; and a charging circuit coupling the oscillator to the capacitor means for charging same by the pulses periodically outputting by the oscillator, the capacitor means being partially discharged by the detector device upon a detection of said phenomenon. The power supply further includes oscillator control means comprising a first control means effective, during a Normal Detection Mode, upon each detection of said phenomenon by said detector device, to trigger said oscillator to immediately output a pulse for recharging said capacitor means; and second control means effective during an Excessive-Phenomenon Detection Mode, to trigger the oscillator to output pulses for recharging the capacitor means continuously as long as the excessive phenomenon is detected.

According to a further aspect of the invention, there is provided an electrical detector system including a power supply as defined above having a battery for powering same; an electrical detector device electrically detecting the aperiodic occurrence of a phenomenon; and an indicator or alarm device actuated by the electrical detector device upon the detection of a predetermined characteristic of the phenomenon.

The invention is particularly applicable to an arrangement wherein the detector device outputs electrical pulses at a rate proportional to the intensity of the detected phenomenon, such as gamma radiation; in such an arrangement, the first-mentioned control means for the electrical switching device is effective, upon the outputting of a predetermined number of pulses from the detector device, to produce a trigger pulse to the free-running oscillator to immediately output a pulse for recharging the capacitor means.

According to another preferred feature, the second control means of the electrical switching device further includes an electrical by-pass circuit from the output of the electrical detector to the electrical switching device effective, upon the outputting of pulses at an exessively high rate indicating an excessively high intensity of the detected phenomenon, to immediately actuate the electrical switching device to output a trigger pulse to the free-running oscillator for the complete interval during which the excessively high intensity condition continues.

According to a still further preferred feature, the detector system further includes a self-test switch effective, when actuated, to cause the switching device to output said trigger pulse to the free-running oscillator for the complete interval during which the self-test switch is activated.

It will thus be seen that the power supply, and the electrical detector system including same, constructed in accordance with the foregoing features provide four modes of operation, namely:

1. a stand-by mode, in which the capacitor means are periodically charged by the free-running oscillator for a short period of time once during each long time interval, for example for 150 ms once during each twelve seconds;

2. a normal detection mode, during which the capacitor means are recharged each time the aperiodically occurring phenomenon (e.g., gamma radiation) is detected;

3. an excessive-radiation mode, during which the capacitor means are continuously recharged whenever an excessively high radiation intensity is detected; and 4. a self-test mode, during which the capacitor means are recharged whenever a self-test is made.

The foregoing four-mode operation provided by the detector system of the present invention substantially reduces the energy normally required by the device while at the same time assuring sufficient energy to actuate the required alarms under all the radiation conditions to which the detector may be subjected. For example, a gamma radiation detector device has been constructed in accordance with the foregoing features of small and compact size, such that it can be carried in the pocket or clipped to the belt of the user, and operated by batteries lasting up to six months before requiring replacement.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Overall Construction

Figure 1:
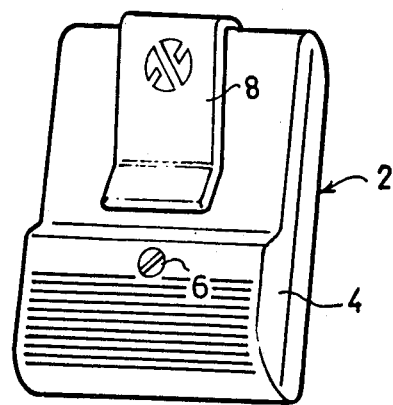
FIG. 1 is a three-dimensional view illustrating a small, portable gamma radiation detector constructed in accordance with the present invention.

With reference first to FIG. 1, there is illustrated a portable, compact gamma radiation detector including a housing 2 enclosing all the electrical components and also its battery supply. The housing includes a cover plate 4 which is removable in order to provide access to the electrical circuit, particularly the batteries therein, which cover plate is secured by a threaded fastener 6. Housing 2 further includes a clip 8 enabling the device to be clipped to the belt of a user, e.g. like a telephone "beeper". Actually, the detector illustrated in FIG. 1 is substantially smaller than a conventional telephone beeper, being approximately one-half the size of a pack of cigarettes.

Figure 2:
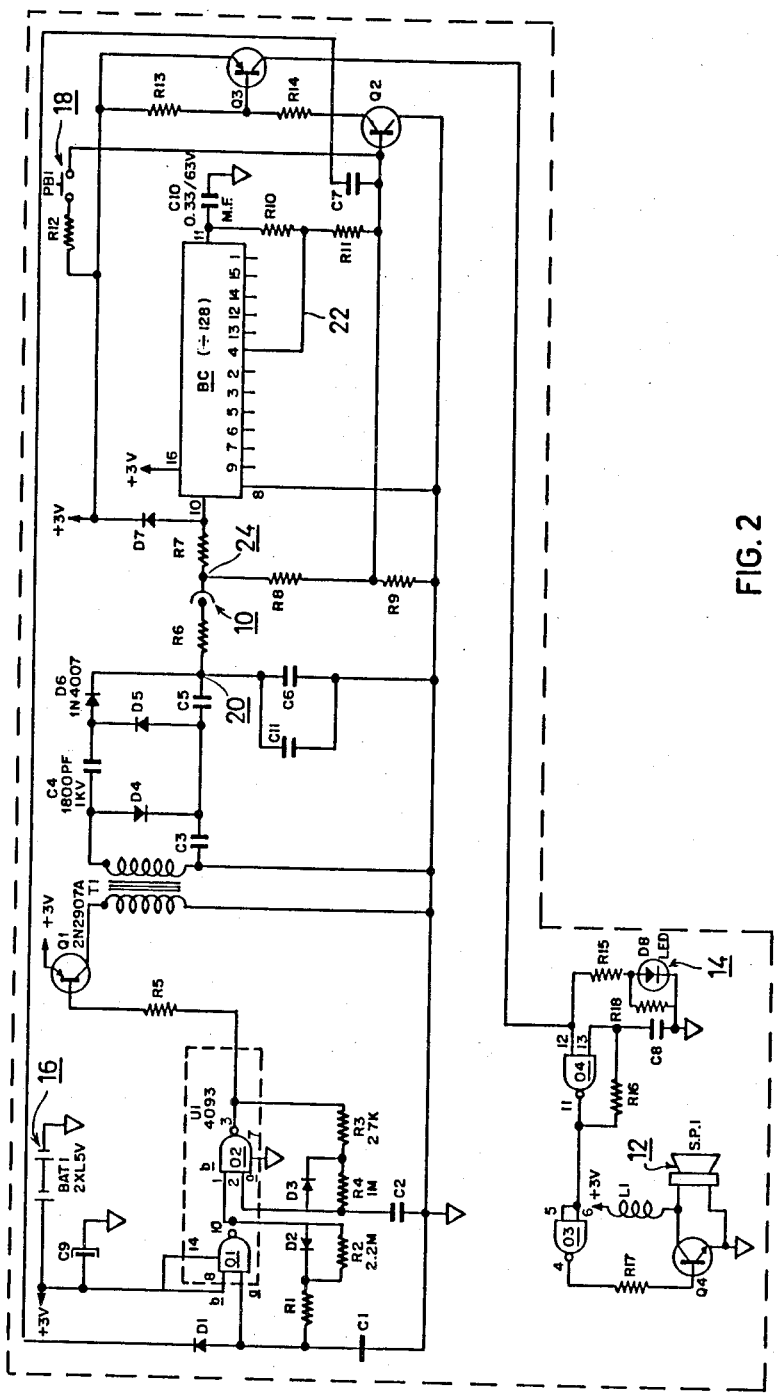
FIG. 2 is a schematic diagram illustrating the circuit in the gamma radiation detector of FIG. 1.

The circuit included within housing 2 is illustrated in FIG. 2, wherein the gamma radiation detector is designated 10, the buzzer which produces the audio alarm is designated 12, and the light source which produces the visual alarm is designated 14. This circuit further includes a battery power supply 16, totalling 3 volts, for operating the device, and a self-test switch 18 which may be manually actuated by the user to indicate whether there is a sufficient charge in the batteries for proper operation of the device.

The power supply includes, in addition to battery 16, a first free-running oscillator O1 whose output is coupled to a second free-running oscillator O2.

Oscillator O1 periodically outputs, at a low repetition rate, square-wave pulses having short widths and long intervals between them Preferably, the pulse repetition rate of oscillator O1 is less than 1 Hz, even less than 0.1 Hz; and the pulse interval is greater than 10 times the pulse width. A preferred output is illustrated by waveform A in FIG. 3, wherein it will be seen that oscillator O1 outputs pulses at the rate of one each twelve seconds (0.08 Hz), and each pulse is of 150 ms duration. These characteristics of oscillator O1 are determined by resistor R1, R2 and diode D2, all coupled between the output of the oscillator and its input terminal a. A second input terminal b of oscillator O1 is connected to the battery source 16, which connection includes a by-pass capacitor C9 to ground.

Terminal a of oscillator O1 is further connected to the juncture of a capacitor C1 and a diode D1 such that, for each pulse applied to diode D1 in the manner to be described below, oscillator O1 is triggered to output a pulse immediately, irrespective of the point it then is in its normal 12-second cycle.

Free-running oscillator O2 operates at a pulse repetition rate determined by resistors R3, R4, diode D3 and capacitor C2, coupled to the oscillator via its input b. The pulse repetition rate of oscillator O2, however, is substantially higher than that of oscillator O1. As one example, oscillator O2 may output square-wave pulses at a rate of about 120 Hz, and having a duty cycle of about 90%. However, oscillator O2 is normally cut-off from oscillating, except when it receives an output pulse at its input b from oscillator O1.

Figure 3:
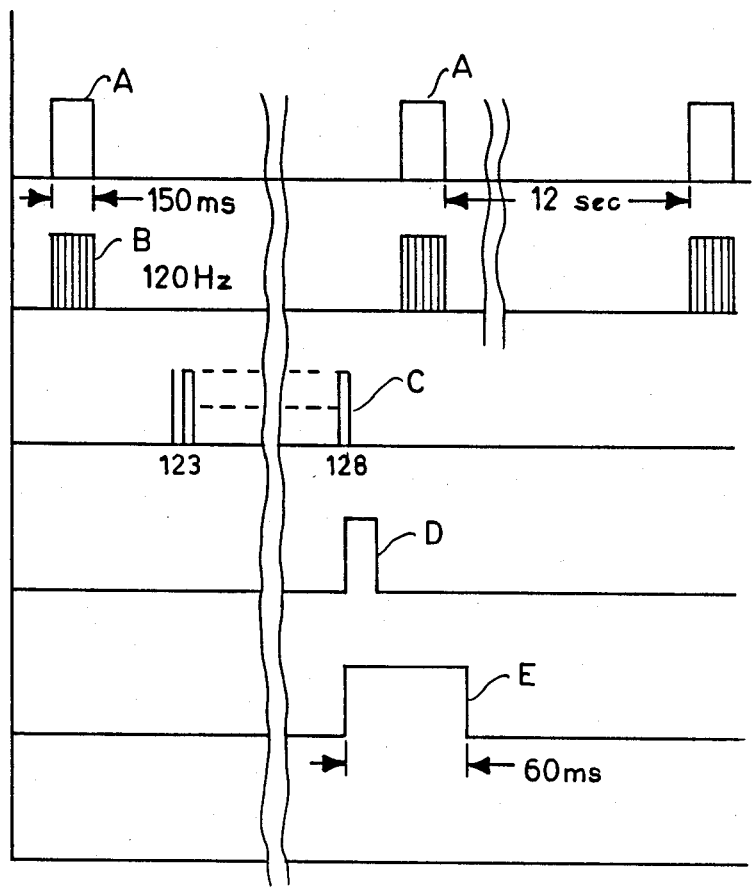
FIG. 3 illustrates a number of waveforms helpful in understanding the circuit of FIG. 2.

The output of oscillator O2 is indicated by waveform B in FIG. 3, wherein it will be seen that this oscillator only produces output pulses during the interval of each output pulse from oscillator O1. Thus, in the example described, oscillator O2 would normally output pulses only for an interval of 150 ms once during each 12 seconds (the cycle period of oscillator O1).

The output from oscillator O2 is applied via resistor R5 and transistor Q1 to the primary winding of a step-up transformer T1. The stepped-up output from the secondary winding of transformer T1 is applied to a voltage double circuit including capacitors C3, C4, C5 and diodes D4. D5, D6, to charge capacitors C6 and C11 to the operating voltage of the detector 10. Two capacitors C6 and C11, connected in parallel, are used for physical size reduction purposes, the two capacitors being equivalent to a single capacitor of larger size.

The charge of capacitors C6, C11 appears as a voltage at point 20 and is applied via resistor R6 to the gamma radiation detector 10. As indicated earlier, such detectors usually require an operating voltage of approximately 500 volts DC, and therefore capacitors C6, C11 must be maintained in this state of charge under all operating conditions in order to permit proper operation of detector 10.

Detector 10 is of the type which, when subjected to gamma radiation, outputs a series of pulses at a rate proportional to the intensity of the gamma radiation detected. These pulses are applied via resistor R7 to a binary counter BC, which counter acts as a pulse divider and produces, for each 128 pulses (waveform C, FIG. 3) inputted thereto from detector 10, one output pulse (waveform D, FIG. 3) which is applied via line 22 to the juncture of two resistors R10, R11.

Resistor R11 is connected to the base of an NPN transistor Q2, the collector of which is connected via resistors R13, R14, to the +3 volt supply. The juncture of resistors R13, R14 is connected to the base of an PNP transistor Q3.

Transistor Q2 acts as an electrical switch effective, when activated, to apply a pulse to the previously-mentioned diode D1 controlling oscillator O1; and transistor Q3 acts as an electrical switch controlling the audio alarm 12. Alarm 12 is preferably a piezoelectric buzzer and is driven by a further oscillator O3, via resistor R17, transistor Q4 and coil L1. The visual alarm 14, preferably an LED (light emitting diode), is driven by a still further oscillator O4, via resistors R15, R16, R18, and capacitor C8.

The pulses outputted to line 22 from binary counter BC (one pulse appearing on line 22 for every 128 pulses outputted by the radiation detector 10) act as triggering pulses for triggering the transistor electrical switches Q2, Q3 to recharge capacitors C6, C11, and also to actuate the alarm devices 12, 14. Each trigger pulse outputted from binary counter BC (waveform D, FIG. 3) is stretched, by a pulse-stretching circuit including capacitor C10 and resistor R10, so as to have a duration of approximately 60 ms (waveform E, FIG. 3); thus, each such recharge of capacitors C6, C11 will be for an interval of 60 ms, and each actuation of the alarm devices 12, 14, will also be for an interval of 60 ms. Oscillator O4 is a free-running oscillator operating at a frequency of approximately 4,000 Hz. Oscillator O3 merely inverts the output pulses from oscillator O4 before such pulses are applied to the audio alarm 12, which thereby operates at an audio frequency of about 4,000 Hz.

The previously mentioned self-test button 18, accessible to the user for testing the condition of the system, is connected via resistor R12 between the +3 volt supply and the base of transistor Q2, such that when the switch is actuated, the +3 volt supply is applied to the base of transistor Q2 to energize it in the same manner that the transistor is energized by each trigger pulse from binary counter BC, except that in this case the transistor remains energized the complete time switch 18 is actuated. Thus, whenever switch 18 is actuated, it energizes transistor Q2, which in turn energizes transistor Q3. Energization of transistor Q3 actuates the audio and visual alarms 12, 14, whereas energization of transistor Q2 makes terminal a of oscillator O1 positive, thereby actuating it to trigger oscillator O2 to recharge capacitors C6, C11.

The base of transistor Q2 is also connected to the juncture between two resistors R8, R9 across the output 24 of the radiation detector 10. Thus, if the radiation detected by the detector is excessive, the detector outputs a continuous stream of pulses at a very high repetition rate and thereby acts similar as a "short" to its capacitors C6, C11, such that the capacitors apply a sufficiently high voltage via detector 10 to the base of transistor Q2 to fire same and thereby to cause oscillators O1 and O2 to recharge the capacitors C6, C11, as well as to cause oscillators O3 and O4 to actuate the audio and visual indicators 12, 14.

Operation

As indicated earlier, the illustrated gamma radiation detector system operates according to four modes, each of which will now be described.

Stand-By Mode

This is the mode of operation when the detector is not subjected to a gamma radiation field. In this case, oscillator O1, which operates at about 0.08 Hz, outputs a pulse of 150 ms each 12 seconds (waveform A FIG. 3), and this pulse is applied to enable oscillator O2 to oscillate, so that the latter produces a stream of higher frequency pulses (waveform B, FIG. 3) but for a short interval of 150 ms, once each 12 seconds. The pulses from oscillator O2 are applied via transistor Q1 to step up-transformer T1 which increases the voltage, and then to the voltage-doubler circuit, including capacitors C3, C4, C5 and diodes D4, D5, which further increases the voltage to charge capacitors C6, C11 to the operating voltage (about 500 volts) of radiation detector 10. Thus, during this mode when no significant radiation is detected, capacitors C6, C11 will be maintained charged at the operating voltage of radiation detector 10 by the pulses from oscillator O2 for a period of 150 ms during each 12 seconds, thereby resulting in a very low drain on the batteries 16.

Normal Detection Mode

Whenever detector 10 detects gamma radiation, it outputs pulses at a rate proportional to the intensity of the detected radiation. These pulses are applied to binary counter BC which produces an output pulse (waveform D, FIG. 3) for each 128 input pulses (waveform C, FIG. 3). Each such output pulse acts as a trigger pulse, is stretched to 60 ms (waveform E, FIG. 3) by pulse-stretching circuit (capacitor C10, resistor R10), and is applied to the base of transistor Q2 to energize same and also to energize transistor Q3. Each energization of transistor Q3 actuates the audio alarm 12 and the visual alarm 14 to thereby indicate the level of the detected radiation; and each actuation of transistor Q2 draws diode D1 to input a "1" to terminal b of oscillator O1 to cause that oscillator to trigger oscillator O2 for a 150 ms interval. This immediately recharges capacitors C6, C11 via the capacitor charging circuit including transistor Q1, step-up transformer T1, and the voltage-doubler network (capacitors C3, C4, C5 and diodes D4, D5, D6).

It will thus be seen that during the above-described normal detection mode, the detected radiation will be indicated by the actuation of the audio and visual indicators 12, 14, and will also be effective to immediately recharge the capacitors C6, C11 to the operating voltage of detector 10 to make-up for their partial discharge as a result of the outputting of pulses from the detector upon detection of the gamma radiation.

Excessive-Radiation Detection Mode

Should the gamma radiation be at an exessively high level, this would cause radiation detector 10 to output pulses at such a high rate as to discharge capacitors C6, C11, thereby possibly "paralyzing" the circuit from properly functioning at this very critical time. However, this possibility is avoided by the voltage-divider circuit of resistors R8, R9, connected between the output 24 from detector 10 and the base of transistor Q2. Thus, if an excesive-radiation condition should be detected, detector 10 acts as a "short", thereby raising the voltage at its output 24 towards that of the capacitors C6, C11, which voltage increase is applied by resistors R7, R8 to fire transistors Q2 and Q3. This immediately actuates oscillators O1 and O2 to recharge capacitors C6, C11, and also actuates the audio and visual indicators 12, 14, both in the same manner described as above with respect to the normal detection mode of operation except that in this case the recharging of the capacitor and the actuation of the alarms will continue so long as the excessive radiation condition exists.

Self-Test Mode

Whenever it is desired to test the condition of the detector, it is only necessary to depress the self-test button 18. When this is done, the +3 volt supply is applied via resistor R12 to the base of transistor Q2, firing it and transistor Q3, and thereby actuating the audio alarm 12 and the visual alarm 13, as well as recharging capacitor C6, C11, in the manner described above, for the complete time interval button 18 is depressed.

While the invention has been described with respect to a gamma radiation detector, it will be appreciated that it could be used in many other applications, e.g., for detecting the aperiodic occurrence of other phenomena, such as other forms of radiation (light rays, X-rays, beta-rays, etc.), or other conditions (sound, heat, humidity, etc.). Many other variations, modifications and applications of the invention will be apparent.

What is claimed is:

1. A power supply for a detector device electrically detecting the aperiodic occurence of a phenomenon, comprising:

a free-running oscillator effective, during a Stand-By Mode, to output at a low repetition rate, pulses having short widths and long intervals between them;

capacitor means chargeable to the detector operating voltage for operating the electrical detector device;

a charging circuit coupling said oscillator to said capacitor means for charging same by the pulses periodically outwarded by the oscillator, said capacitor means being partially discharged by said detector device upon a detection of said phenomenon;

and oscillator control means including:

first control means effective, during a Normal Detection Mode upon each detection of said phenomenon by said detector device, to trigger said oscillator to immediately output a pulse for recharging said capacitor means;

and second control means effective, during an Excessive-Phenomenon Detection Mode, to trigger said oscillator to output pulses for recharging said capacitor means continuously as long as the excessive phenomenon is detected.

2. The power supply according to claim 1, further including an indicator device providing an indication each time said phenomenon is detected.

3. The power supply according to claim 2, wherein said oscillator control means comprises third control means including a self-test switch effective, when actuated during a Self-Test Mode to test said indicator device, also to trigger said oscillator to output pulses for recharging said capacitator means continuously as long as said self-test switch is actuated.

4. The power supply according to claim 1, wherein said charging circuit comprises a second oscillator which is enabled by each pulse outputted from said free-running oscillator to output a train of pulses at a high repetition rate to charge said capacitor means.

5. The power supply according to claim 4, wherein said charging circuit further comprises a step-up transformer for increasing the voltage of said pulses outputted by said second oscillator before applied to said capacitor means for charging same.

6. The power supply according to claim 5, wherein said charging circuit further comprises a voltage doubler circuit for further increasing the voltage of said pulses outputted by said second oscillator and said step-up transformer before applied to said capacitor means for charging same.

7. An electrical detector system, comprising:
a power supply according to claim 1;
a battery for powering said power supply:
an electrical detector device electrically detecting the aperiodic occurence of a phenomena;
and an indicator device actuated by said detector device upon the detection of a predetermined characteristic of said phenomen.

8. The detector system according to claim 7, wherein said detector device outputs electrical pulses at a rate proportional to the intensity of said detected phenomenon, said oscillator control means comprising an electrical switching device and a counter effective, upon the outputting of a predetermined number of pulses from said detecting device, to produce a trigger pulse to said free-running oscillator causing same to immediately output a pulse for recharging said capacitor means.

9. The electrical detector system according to claim 8, wherein said detector device is a gamma radiation detector which outputs pulses at a rate proportional to the intensity of the gamma radiation detection.

10. The system according to claim 8, wherein said second control means includes an electrical by-pass circuit from the output of said electrical detector to said electrical switching device effective, upon the outputting of pulses at an excessively high rate indicating an excessively high intensity of the detected phenomenon, to immediately actuate said electrical switching device to output said trigger pulse to said free-running oscillator for the complete interval during which the excessively high intensity condition continues.

11. The system according to claim 10, wherein said electrical by-pass circuit comprises a voltage divider connected to receive the output voltage of said detector device and including a connection to said electrical switching device.

12. The system according to claim 8, wherein said second control means further comprises a pulse-stretcher dircuit for stretching said trigger pulse to cause said free-running oscillator to output a pulse corresponding to the increased width of said trigger pulse.

13. The system according to claim 8, wherein said trigger pulse outputted by said detector device is also applied to said indicator device to actuate same for the duration of the trigger pulse.

14. An electrical detector system, comprising:
a detector device electrically detecting the aperiodic occurrence of a phenomenon:
a battery for powering said electrical detector device;
a free-running oscillator effective, during a Stand-By Mode, to output at a low repetition rate, pulses having short widths and long intervals between them;
capacitor means chargeable to the detector operating voltage for operating the electrical detector device;
a charging circuit coupling said oscillator to said capacitor means for charging same by the pulses periodically outputted by the oscillator, said capacitor means being partially discharged by said detector device upon a detection of said phenomenon;
an oscillator control means comprising a switching device including:
first control means effective, during a Normal Detection Mode, to actuate said switching device upon each detection of said phenomenon by said detector device, to trigger said oscillator to immediately output a pulse for recharging said capacitor means;
second control means effective, during an Excessive-Phenomenon Detection Mode, to actuate said switching device to trigger said oscillator to output pulses for recharging said capacitor means continuously as long as the excessive phenomenon is detected;
and an alarm device actuated by said detector device upon the detection of a predetermined characteristic of said pheonomenon.

15. The system according to claim 14, wherein said switching device of the oscillator control means comprises third control means including a self-test switch effective, when actuated during a Self-Test Mode to test said indicator device, also to actuate said switching device to trigger said oscillator to output pulses for recharging said capactator means continuously as long as said self-test switch is actuated.

16. The system according to claim 14, wherein said charging circuit comprises a second oscillator which is enabled by each pulse outputted from said free-running oscillator to output a train of pulses at a high repetition rate to charge said capacitor means.

17. A gamma radiation monitoring system, comprising:
   a gamma radiation detector;
   a battery for powering said gamma radiation detector;
   a free-running oscillator effective, during a Stand-By Mode, to output at a low repetition rate, pulses having short widths and long intervals between them;
   capacitor means chargeable to the detector operating voltage for operating the gamma radiation detector;
   a charging circuit coupling said oscillator to said capacitor means for charging same by the pulses periodically outputted by the oscillator, said capacitor means being partially discharged by said gamma radiation detector upon a detection of gamma radiation;
   an oscillator control means comprising a switching device including:
   first control means effective, during a Normal Detection Mode, to actuate said switching device upon each detection of gamma radiation, to trigger said oscillator to immediately output a pulse for recharging said capacitor means; and
   second control means effective, during an Excessive-Radiation Detection Mode, to actuate said switching device to trigger said oscillator to output pulses for recharging said capacitor means continuously as long as the excessive radiation is detected;
   and an alarm device actuated by said detector.

18. The system according to claim 17, wherein said gamma radiation detector outputs electrical pulses at a rate proportional to the intensity of the detected gamma radiation, said first control means including a counter effective, upon the outputting of a predetermined number of pulses from said gamma radiation detector, to produce a trigger pulse to said free-running oscillator causing same to immediately output a pulse for recharging said capacitor means.

* * * * *